United States Patent
Nishie et al.

(10) Patent No.: US 10,141,607 B2
(45) Date of Patent: Nov. 27, 2018

(54) NONAQUEOUS ELECTROLYTE SECONDARY BATTERY

(71) Applicant: GS Yuasa International Ltd., Kyoto-shi, Kyoto (JP)

(72) Inventors: Katsushi Nishie, Kyoto (JP); Yudai Kawasoe, Kyoto (JP); Takeshi Hachida, Kyoto (JP)

(73) Assignee: GS Yuasa International Ltd., Kyoto (JP)

( * ) Notice: Subject to any disclaimer, the term of this patent is extended or adjusted under 35 U.S.C. 154(b) by 0 days.

(21) Appl. No.: 15/122,534

(22) PCT Filed: Feb. 26, 2015

(86) PCT No.: PCT/JP2015/000998
§ 371 (c)(1),
(2) Date: Aug. 30, 2016

(87) PCT Pub. No.: WO2015/133097
PCT Pub. Date: Sep. 11, 2015

(65) Prior Publication Data
US 2017/0077550 A1 Mar. 16, 2017

(30) Foreign Application Priority Data

Mar. 3, 2014 (JP) ................................ 2014-040745

(51) Int. Cl.
*H01M 10/0567* (2010.01)
*H01M 10/052* (2010.01)
*H01M 10/0525* (2010.01)
*H01M 10/42* (2006.01)
*H01M 2/16* (2006.01)

(52) U.S. Cl.
CPC ..... *H01M 10/0567* (2013.01); *H01M 2/1686* (2013.01); *H01M 10/052* (2013.01); *H01M 10/0525* (2013.01); *H01M 10/4235* (2013.01); H01M 2220/20 (2013.01); H01M 2300/0025 (2013.01); *Y02T 10/7011* (2013.01)

(58) Field of Classification Search
None
See application file for complete search history.

(56) References Cited

U.S. PATENT DOCUMENTS

| | | | |
|---|---|---|---|
| 2007/0172729 A1 | 7/2007 | Ha | |
| 2008/0014496 A1 | 1/2008 | Watanabe | |
| 2011/0111288 A1 | 5/2011 | Nishida | |
| 2011/0223089 A1 | 9/2011 | Nishida | |
| 2011/0223488 A1 | 9/2011 | Nishida | |
| 2012/0107700 A1 | 5/2012 | Deguchi | |
| 2012/0288751 A1* | 11/2012 | Kako | H01M 2/166 429/188 |
| 2014/0011082 A1 | 1/2014 | Yamamoto | |
| 2016/0211551 A1* | 7/2016 | Miyasato | C07D 327/10 |

FOREIGN PATENT DOCUMENTS

| | | |
|---|---|---|
| CN | 102036912 A | 4/2011 |
| EP | 2166611 A1 | 3/2010 |
| JP | 2001015158 A2 | 1/2001 |
| JP | 2005229103 A2 | 8/2005 |
| JP | 2008269978 A2 | 11/2008 |
| JP | 2008269982 | 11/2008 |
| JP | 2009524206 T2 | 6/2009 |
| JP | 2011049152 A2 | 3/2011 |
| JP | 2012190700 A2 | 10/2012 |
| JP | 2014029849 A2 | 2/2014 |
| WO | 2008133207 A1 | 11/2008 |
| WO | 2011121912 A1 | 10/2011 |

OTHER PUBLICATIONS

International Search Report dated Apr. 7, 2015 filed in PCT/JP2015/000998.

* cited by examiner

*Primary Examiner* — Sin J Lee

(57) ABSTRACT

An object of the present invention is to provide a nonaqueous electrolyte secondary battery including a monofluorotoluene-containing nonaqueous electrolyte with an improved overcharge-preventing effect. In a monofluorotoluene-containing nonaqueous electrolyte, when a specific fluorophosphate compound is contained, the overcharge-preventing effect of the monofluorotoluene can be improved. As a result, in the overcharged state of a nonaqueous electrolyte secondary battery including the monofluorotoluene-containing nonaqueous electrolyte, an increase in the battery surface temperature can be suppressed.

9 Claims, 2 Drawing Sheets

NONAQUEOUS ELECTROLYTE SECONDARY BATTERY

TECHNICAL FIELD

The present invention relates to a nonaqueous electrolyte secondary battery using a nonaqueous electrolyte containing a monofluorotoluene.

BACKGROUND ART

Nonaqueous electrolyte secondary batteries, typified by lithium ion secondary batteries, have high energy densities, and are often used as power supplies for mobile phones, laptop computers, and the like. In recent years, use as automotive power supplies for electric vehicles, etc., has also been considered.

Generally, a nonaqueous electrolyte secondary battery is designed as follows:

a positive electrode plate, which is prepared by forming a positive composite layer containing a positive active material on the surface of a positive current collector, and a negative electrode plate, which is prepared by forming a negative composite layer containing a negative active material on the surface of a negative current collector, are placed to face each other via an electrically insulating separator, allowing ions to be transferred between the positive electrode and the negative electrode through a nonaqueous electrolyte having a supporting salt dissolved in a nonaqueous solvent, thereby performing charge-discharge.

Meanwhile, a nonaqueous electrolyte secondary battery is generally controlled so that the voltage will not go beyond a predetermined range. However, when a current is forcibly supplied to the battery for some reason, the battery may turn into an overcharged state, that is, may have a voltage over the energy storage capacity of the battery. In such an overcharged state, the nonaqueous solvent may undergo an oxidation decomposition reaction on the surface of the positive electrode, or lithium metal may be deposited as dendrites on the negative electrode, causing a short circuit. The suppression thereof has been an important issue in nonaqueous electrolyte secondary batteries.

Conventionally, as a measure against the overcharged state of a nonaqueous electrolyte secondary battery, an overcharge inhibitor is added to the nonaqueous electrolyte. As overcharge inhibitors, compounds that undergo oxidation polymerization in an overcharged state to form a high-resistance film form on the surface of an active material, compounds that undergo an oxidation reduction reaction to cause self discharge or internal short-circuiting, compounds that cause gas generation to operate an internal-pressure-operated electricity cutoff valve, and the like are known. For example, Patent Document 1 discloses that aromatic compounds such as toluene, ethylbenzene, cyclohexylbenzene, 4-t-butyl toluene, and biphenyl are usable as overcharge inhibitors.

PRIOR ART DOCUMENTS

Patent Documents

Patent Document 1: JP-A-2001-015158

SUMMARY OF THE INVENTION

Problems to be Solved by the Invention

It is known that a monofluorotoluene functions as an overcharge inhibitor. Then, when a monofluorotoluene-containing battery turns into an overcharged state, it is desired that the overcharge-preventing effect of the monofluorotoluene is developed more rapidly.

An object of the present invention is to provide a nonaqueous electrolyte secondary battery including a monofluorotoluene-containing nonaqueous electrolyte having an improved overcharge-preventing effect.

Means for Solving the Problems

The present inventors have conducted extensive research to solve the above problems. As a result, they have found that in a monofluorotoluene-containing nonaqueous electrolyte, when a specific fluorophosphate compound is contained, the overcharge-preventing effect of the monofluorotoluene can be improved.

A first aspect of the present invention is a nonaqueous electrolyte secondary battery including a nonaqueous electrolyte. The nonaqueous electrolyte contains a monofluorotoluene and a fluorophosphate compound represented by the following general formula (1). The content of the monofluorotoluene is 10 mass % or less per the nonaqueous electrolyte, and the content of the fluorophosphate compound represented by general formula (1) is 6 mass % or less per the nonaqueous electrolyte.

[Chemical Formula 1]

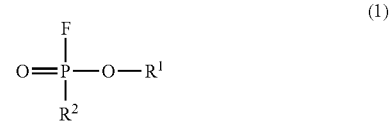

[In general formula (1), $R^1$ represents an alkali metal element or a alkyl group having 1 to 3 carbon atoms, and $R^2$ represents fluorine, an —O-A group (A represents an alkali metal element), or a alkoxy group having 1 to 3 carbon atoms.]

Like this, when a monofluorotoluene and a specific fluorophosphate compound are both present in a nonaqueous electrolyte, the overcharge-preventing effect of the monofluorotoluene can be improved.

Advantages of the Invention

According to the present invention, a nonaqueous electrolyte secondary battery including a monofluorotoluene-containing nonaqueous electrolyte with an improved overcharge-preventing effect can be provided.

MODE FOR CARRYING OUT THE INVENTION

Figure 1:
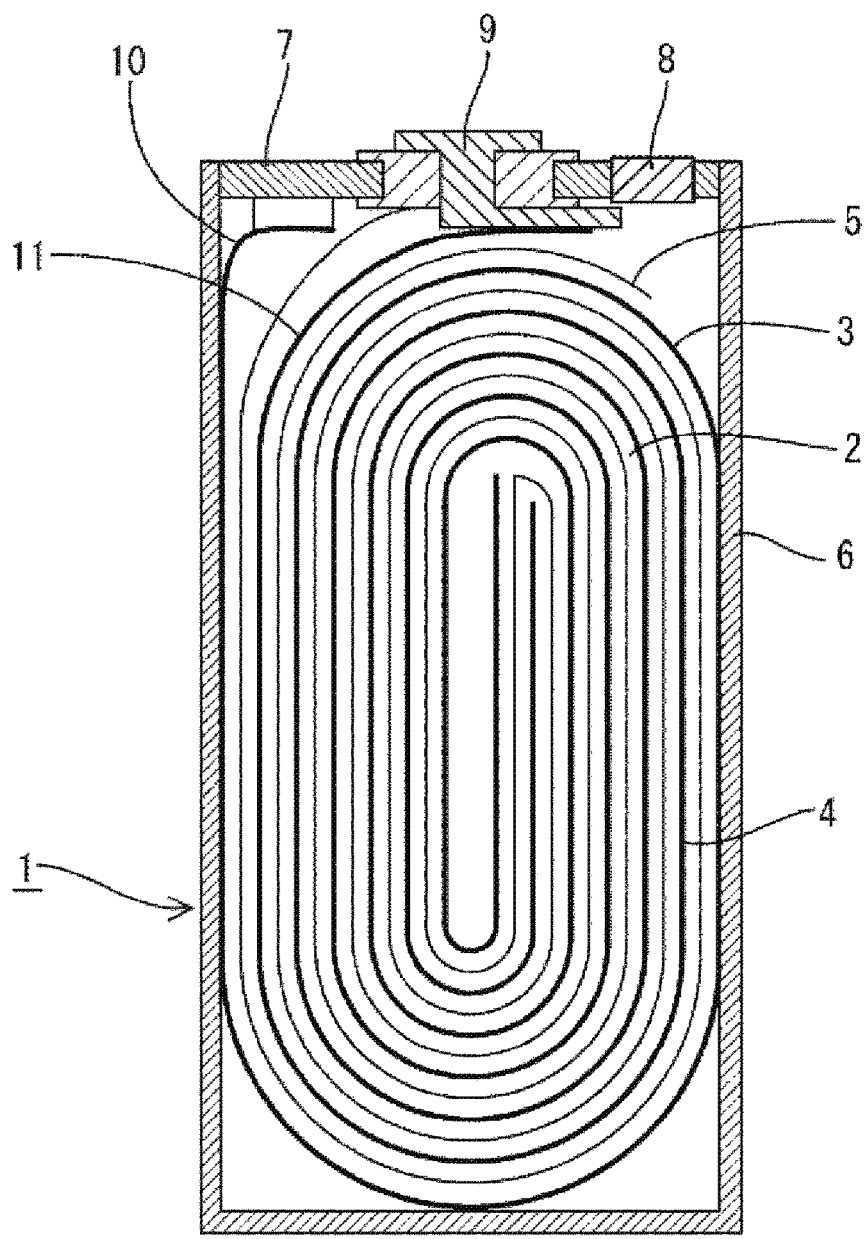
FIG. 1 is a schematic cross-sectional view of a nonaqueous electrolyte secondary battery according to an aspect of the present invention.

According to a second aspect of the present invention, in the nonaqueous electrolyte secondary battery according to the first aspect, the fluorophosphate compound represented by general formula (1) is at least one of lithium difluorophosphate and lithium monofluorophosphate. By using such a fluorophosphate compound, the overcharge-preventing effect can be improved even more effectively.

According to a third aspect of the present invention, in the nonaqueous electrolyte secondary battery according to the first aspect, the fluorophosphate compound represented by general formula (1) is lithium difluorophosphate. By using such a fluorophosphate compound, the overcharge-preventing effect can be improved even more effectively.

According to a forth aspect of the present invention, in the nonaqueous electrolyte secondary battery according to any one of the first to third aspects, the monofluorotoluene is 2-fluorotoluene.

According to a fifth aspect of the present invention, in the nonaqueous electrolyte secondary battery according to any one of the first to fourth aspects, the content of the monofluorotoluene is 8 mass % or less per the nonaqueous electrolyte.

According to a sixth aspect of the present invention, in the nonaqueous electrolyte secondary battery according to any one of the first to fifth aspects, the content of the fluorophosphate compound represented by general formula (1) is 4 mass % or less per the nonaqueous electrolyte.

According to a seventh aspect of the present invention, in the nonaqueous electrolyte secondary battery according to any one of the first to sixth aspects, the nonaqueous electrolyte secondary battery includes a positive electrode, a negative electrode, a separator, and an insulating layer, and the separator and the insulating layer are placed between the positive electrode and the negative electrode.

According to an eighth aspect of the present invention, in the nonaqueous electrolyte secondary battery according to the seventh aspect, the insulating layer is a porous layer containing an inorganic oxide.

According to a ninth aspect of the present invention, in the nonaqueous electrolyte secondary battery according to the seventh or eighth aspect, the insulating layer is formed on a surface of the separator facing the positive electrode.

A tenth aspect of the present invention is an assembled battery including a plurality of the nonaqueous electrolyte secondary batteries according to any one of the first to ninth aspects.

An eleventh aspect of the present invention is an energy storage apparatus including the assembled battery according to the tenth aspect.

A twelfth aspect of the present invention is an automobile including the energy storage apparatus according to the eleventh aspect.

A thirteenth aspect of the present invention is a plug-in hybrid electric vehicle including the energy storage apparatus according to the eleventh aspect.

A fourteenth aspect of the present invention is a method for producing a nonaqueous electrolyte secondary battery including a nonaqueous electrolyte, the method including using a nonaqueous electrolyte containing a monofluorotoluene and a fluorophosphate compound represented by the following general formula (1). The content of the monofluorotoluene is 10 mass % or less per the nonaqueous electrolyte, and the content of the fluorophosphate compound represented by general formula (1) is 6 mass % or less per the nonaqueous electrolyte. Such a production method makes it possible to produce a nonaqueous electrolyte secondary battery including a monofluorotoluene-containing nonaqueous electrolyte having an improved overcharge-preventing effect.

The nonaqueous electrolyte secondary battery of the present invention is a nonaqueous electrolyte secondary battery including a nonaqueous electrolyte of specific composition. The nonaqueous electrolyte secondary battery of the present invention may also include, in addition to the nonaqueous electrolyte, a positive electrode, a negative electrode, and a separator placed between the positive electrode and the negative electrode. Hereinafter, components of the nonaqueous electrolyte secondary battery of the present invention will be described in detail.

[Nonaqueous Electrolyte]

The nonaqueous electrolyte used in the nonaqueous electrolyte secondary battery of the present invention contains a monofluorotoluene and a specific fluorophosphate compound. Like this, when a monofluorotoluene and a specific fluorophosphate compound are both present in the nonaqueous electrolyte, the overcharge-preventing effect of the monofluorotoluene can be improved. The reason for this is considered to be as follows: as a result of the formation of a film derived from the fluorophosphate compound represented by general formula (1) on the positive electrode-nonaqueous electrolyte interface, in an overcharged state of the battery, the monofluorotoluene undergoes a selective oxidation reaction on the positive electrode-nonaqueous electrolyte interface, thereby suppressing the oxidation decomposition reaction of the nonaqueous solvent.

In addition, when a monofluorotoluene is contained in a nonaqueous electrolyte, the monofluorotoluene decreases the viscosity of the nonaqueous electrolyte to enhance the permeability. Thus, it is expected that in the case where the battery is not in an overcharged state, the battery performance, such as cycle characteristics, is prevented from being impaired.

The binding site of the fluorine atom in the monofluorotoluene is not particularly limited, and may be any of the ortho position, meta position, and para position. In addition, a mixture thereof is also possible. Among them, a monofluorotoluene wherein the binding site of the fluorine atom is the meta position or ortho position (metafluorotoluene or orthofluorotoluene) has a high reaction starting potential and thus is preferable. Meanwhile, a monofluorotoluene wherein the binding site of the fluorine atom is the para position (parafluorotoluene) has a high reaction rate, but the reaction starting potential is low. Accordingly, parafluorotoluene may react in a normal used voltage range, at which the battery is not in an overcharged state, thereby adversely affecting the battery characteristics.

The nonaqueous electrolyte of the present invention contains 10 mass % or less of the monofluorotoluene per the total mass of the nonaqueous electrolyte. The content of the monofluorotoluene is not particularly limited as long as it is 10 mass % or less per the nonaqueous electrolyte, but is preferably 8 mass % or less. In addition, the content of the monofluorotoluene is preferably 0.5 mass % or more, more preferably 2 mass % or more, and still more preferably 4 mass % or more, per the nonaqueous electrolyte. When such a content is satisfied, the overcharge-preventing effect can be effectively developed. When the content of the monofluorotoluene is 0.5 mass % or more per the nonaqueous electrolyte, the overcharge-preventing effect can be sufficiently developed; therefore, this is preferable. When the content of the monofluorotoluene is more than 10 mass % per the nonaqueous electrolyte, the ion conductivity of the nonaqueous electrolyte decreases, and the input-output characteristics of the battery are deteriorated; therefore, this is not preferable.

The fluorophosphate compound used in the invention is a compound represented by the following general formula (1).

[Chemical Formula 2]

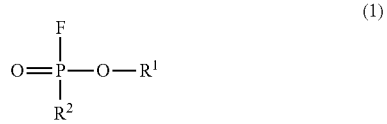

(1)

In general formula (1), $R^1$ represents an alkali metal element or an alkyl group having 1 to 3 carbon atoms. $R^1$ is preferably a lithium atom or a alkyl group having 1 to 3 carbon atoms, more preferably lithium or a alkyl group having 1 or 2 carbon atoms, and still more preferably lithium.

In addition, $R^2$ represents fluorine, an —O-A group (A represents an alkali metal), or a alkoxy group having 1 to 3 carbon atoms. $R^2$ is preferably fluorine, an —O—Li group, or a alkoxy group having 1 to 3 carbon atoms, more preferably fluorine, an —O—Li group, or a alkoxy group having 1 or 2 carbon atoms, and still more preferably fluorine or an —O—Li group.

Specific examples of fluorophosphate compounds represented by general formula (1) include lithium difluorophosphate [in general formula (1), $R^1$ is lithium, and $R^2$ is fluorine], lithium monofluorophosphate [in general formula (1), $R^1$ is lithium, $R^2$ is an —O—Li group], methyl difluorophosphate [in general formula (1), $R^1$ is a methyl group, and $R^2$ is fluorine], ethyl difluorophosphate [in general formula (1), $R^1$ is an ethyl group, and $R^2$ is fluorine], propyl difluorophosphate [in general formula (1), $R^1$ is a propyl group, and $R^2$ is fluorine], dimethyl monofluorophosphate [in general formula (1), $R^1$ is a methyl group, and $R^2$ is a methoxy group], diethyl monofluorophosphate [in general formula (1), $R^1$ is an ethyl group, and $R^2$ is an ethoxy group], ethyl-methyl monofluorophosphate [in general formula (1), $R^1$ is a methyl group, and $R^2$ is an ethoxy group], methyl-lithium monofluorophosphate [in general formula (1), $R^1$ is lithium, and $R^2$ is a methoxy group], sodium difluorophosphate [in general formula (1), $R^1$ is sodium, and $R^2$ is fluorine], and lithium monofluorophosphate [in general formula (1), $R^1$ is sodium, and $R^2$ is an —O—Na group.] Among these fluorophosphate compounds, in terms of further increasing the overcharge-preventing effect, lithium difluorophosphate and lithium monofluorophosphate are preferable, and lithium difluorophosphate is still more preferable.

These fluorophosphate compounds represented by general formula (1) may be used alone, and it is also possible to use two or more kinds in combination.

The nonaqueous electrolyte of the present invention contains 6 mass % or less of the fluorophosphate compound represented by general formula (1) per the total mass of the nonaqueous electrolyte. The content of the fluorophosphate compound represented by general formula (1) is not particularly limited as long as it is 6 mass % or less per the nonaqueous electrolyte, but is preferably 4 mass % or less, more preferably 2 mass % or less, and still more preferably 2 mass % or less. In addition, the content of the fluorophosphate compound represented by general formula (1) is preferably 0.05 mass % or more, more preferably 0.1 mass % or more, and still more preferably 0.5 mass % or more, per the nonaqueous electrolyte. When such a content is satisfied, the overcharge-preventing effect can be improved. In addition, when the content of the fluorophosphate compound represented by general formula (1) is 4 mass % or less per the nonaqueous electrolyte, coloring of the nonaqueous electrolyte is less likely to occur; therefore, this is preferable.

The nonaqueous electrolyte contains a supporting salt. Supporting salts for use in the nonaqueous electrolyte are not particularly limited, and lithium salts, which are generally used in nonaqueous electrolyte secondary batteries and stable in a wide potential range, may be used. Examples of such supporting salts include $LiBF_4$, $LiPF_6$, $LiClO_4$, $LiCF_3SO_3$, $LiN(CF_3SO_2)_2$, $LiN(C_2F_5SO_2)_2$, $LiN(CF_3SO_2)(C_4F_9SO_2)$, $LiC(CF_3SO_2)_3$, $LiB(C_2O_4)_2$, and $LiC(C_2F_5SO_2)_3$. These supporting salts may be used alone, and it is also possible to use a mixture of two or more kinds. The content of the supporting salt in the nonaqueous electrolyte is not particularly limited, and may be suitably set according to the kind of supporting salt used, the kind of nonaqueous solvent, and the like, but is preferably 5.0 mol/L or less, and more preferably 2.0 mol/L or less. In addition, the content of the supporting salt in the nonaqueous electrolyte is preferably 0.1 mol/L or more, and more preferably 0.8 mol/L or more.

The nonaqueous electrolyte contains a nonaqueous solvent in order to dissolve the components described above. Nonaqueous solvents for use in the nonaqueous electrolyte are not particularly limited, and organic solvents generally used as such nonaqueous solvents in nonaqueous electrolytes may be used. Examples of such nonaqueous solvents include propylene carbonate, ethylene carbonate, dimethyl carbonate, diethyl carbonate, and ethyl methyl carbonate. These nonaqueous solvents may be used alone, and it is also possible to use a mixture of two or more kinds.

Further, the nonaqueous electrolyte may also contain, in addition to the monofluorotoluene, fluorophosphate compound represented by general formula (1), supporting salt, and nonaqueous solvent, as necessary, additives such as negative electrode film forming agents and positive electrode protecting agents. Specific examples of negative electrode film forming agents include vinylene carbonate and vinyl ethylene carbonate. In addition, specific examples of positive electrode protecting agents include propane sultone. These additives may be used alone, and it is also possible to use a mixture of two or more kinds. In addition, the content of these additives in the nonaqueous electrolyte is not particularly limited, and may be suitably set according to the kinds of additives and the like, but is preferably 5 mass % or less per the nonaqueous electrolyte. In addition, the content of the additives is preferably 0.01 mass % or more, more preferably 0.2 mass %, per the nonaqueous electrolyte.

[Positive Electrode]

As the positive electrode of the nonaqueous electrolyte secondary battery of the present invention, a positive electrode plate prepared by forming a positive composite layer on a positive current collector is used.

The positive composite layer contains a positive active material. The positive active material is not particularly limited as long as it is capable of reversibly storing and releasing lithium ions, and may be an inorganic compound or an organic compound. Specific examples of inorganic compounds for use as the positive active material include lithium-nickel composite oxides (e.g., $Li_xNiO_2$, etc.), lithium-cobalt composite oxides (e.g., $Li_xCoO_2$, etc.), lithium-nickel-cobalt composite oxides (e.g., $LiN_{1-y}Co_yO_2$, etc.), lithium-nickel-cobalt-manganese composite oxides (e.g., $LiNi_xCo_yMn_{1-x-y}O_2$, etc.), spinel-type lithium-manganese composite oxides ($Li_xMn_2O_4$, etc.), and lithium phosphorus oxides having an olivine structure (e.g., $Li_xFePO_4$, $Li_xFe_{1-y}Mn_yPO_4$, etc.). In addition, specific examples of organic compounds for use as the positive active material include electrically conductive polymer materials such as polyaniline and polypyrrole, disulfide-based polymer materials, and fluorinated carbon. These positive active materials may be used alone, and it is also possible to use two or more kinds in combination.

In addition, the positive composite layer may also contain, in addition to the positive active materials described above, as necessary additives such as electrical conductors, binders, and fillers.

Examples of electrical conductors include electrically conductive materials such as carbon black, acetylene black, ketjen black, carbon whisker, carbon fiber, metal (copper, nickel, aluminum, silver, gold, etc.) powders, metal fiber, and electrically conductive ceramic materials. These electrical conductors may be used alone, and it is also possible to use two or more kinds in combination.

Examples of binders include polytetrafluoroethylene (PTFE), polyvinylidene fluoride (PVDF), vinylidene fluoride-hexafluoropropylene copolymer, styrene-butadiene rubber (SBR), polyacrylonitrile, and fluororubber. These binders may be used alone, and it is also possible to use two or more kinds in combination. In addition, in the case where styrene-butadiene rubber is used as a binder, it is preferable that carboxymethylcellulose (CMC) is added as a thickener.

Positive current collector for use in the positive electrode are not particularly limited, and examples thereof include metal materials such as aluminum, tantalum, niobium, titanium, hafnium, zirconium, zinc, tungsten, bismuth, and alloys containing these metals; and carbonaceous materials such as carbon cloth and carbon paper. Among them, aluminum is preferable.

The positive electrode used in the present invention is prepared by applying a positive composite onto a positive current collector to form a predetermined shape, and then adjusting the density and thickness of the positive composite layer by drying, roll pressing, or the like. As conditions for application, drying, and the like, known conditions may be employed.

[Negative Electrode]

As the negative electrode of the nonaqueous electrolyte secondary battery of the present invention, a negative electrode plate prepared by forming a negative composite layer on a negative current collector is used.

The negative composite layer contains a negative active material. The negative active material is not particularly limited as long as it is capable of reversibly storing and releasing lithium ions. Specific examples of negative active materials include amorphous carbon such as non-graphitizable carbon (hard carbon) and graphitizable carbon (soft carbon); graphite; alloys of lithium with a metal such as Al, Si, Pb, Sn, Zn, or Cd; tungsten oxide; molybdenum oxide; iron sulfide; titanium sulfide; and lithium titanate. These negative active materials may be used alone, and it is also possible to use two or more kinds in combination.

In addition, the negative composite layer may also contain, in addition to the negative active materials described above, as necessary, additives such as electric conductors, binders, and fillers. The kinds of these additives are the same as those to be incorporated into the positive composite layer.

Negative current collectors for use in the negative electrode are not particularly limited, and examples thereof include metal materials such as copper, nickel, stainless steel, nickel-plated steel, and chrome-plated steel. Among them, in terms of ease of processing and cost, copper is preferable.

The negative electrode used in the present invention is prepared by applying a negative composite onto a negative current collector to form a predetermined shape, and then adjusting the density and thickness of the negative composite layer by drying, roll pressing, or the like. As conditions for application, drying, and the like, known conditions may be employed.

[Separator]

The separator used in the nonaqueous electrolyte secondary battery of the present invention is not particularly limited as long as it has insulating properties, and a microporous membrane, a nonwoven fabric, or the like is used. Examples of materials to form a separator include polyolefin resins such as polyethylene and polypropylene. These materials may be used alone, and it is also possible to use two or more kinds in combination. The separator may be placed between the positive electrode and the negative electrode.

In the nonaqueous electrolyte secondary battery of the present invention, aside from the separator, an insulating layer may be placed between the positive electrode and the negative electrode. When an insulating layer is placed between the positive electrode and the negative electrode aside from the separator, even in the case where the usage mode of the nonaqueous electrolyte secondary battery is outside the range of the usually expected usage mode, whereby the nonaqueous electrolyte secondary battery undergoes abnormal heat generation to cause the thermal contraction of the separator, the insulating layer remains, making it possible to suppress the electrical contact between the positive electrode and the negative electrode.

The insulating layer may be an insulating porous layer. For example, it is possible to employ a porous layer containing an inorganic oxide, a porous layer containing resin beads, a porous layer containing a heat-resistant resin such as aramid resin, or the like. In the nonaqueous electrolyte secondary battery of the present invention, it is preferable that the insulating layer is a porous layer containing an inorganic oxide. The porous layer containing an inorganic oxide to serve as an insulating layer may contain a binding material and a thickener as necessary.

Binders and thickeners to be contained in the porous layer are not each particularly limited. For example, the same ones as those used for a composite layer (positive composite layer or negative composite layer) may be used.

As inorganic oxides, known ones may be used. However, inorganic oxides, which have excellent chemical stability are preferable. Examples of such inorganic oxides include alumina, titania, zirconia, magnesia, silica, and boehmite. It is preferable to use an inorganic oxide in powder form. The average particle size of the inorganic oxide is not particularly limited, but preferably 10 µm or less, more preferably 8 µm or less, still more preferably 5 µm or less, and yet more preferably 3 µm or less. In addition, the average particle size of the inorganic oxide is not particularly limited, but preferably 0.01 µm or more, more preferably 0.05 µm or more, and still more preferably 0.1 µm or more. Inorganic oxide may be used alone, and it is also possible to use two or more kinds in combination.

The insulating layer may be formed on at least one of the following positions: one surface of the separator, both surfaces of the separator, the surface of the positive composite layer, and the surface of the negative composite layer. In addition, in the case where the insulating layer is formed on the surface of a composite layer, it is possible that at least part of the composite layer is covered with the insulating layer, and it is also possible that the entire surface of the composite layer is covered with the insulating layer.

As a method for forming an insulating layer, a known method may be employed. For example, the insulating layer can be formed by applying a composite for insulating layer formation containing an inorganic oxide and a binder to at least one of the following positions, followed by drying: one surface of the separator, both surfaces of the separator, the surface of the positive composite layer, and the surface of the negative composite layer.

In the case where an inorganic oxide and a binder are contained in the composite for insulating layer formation, the content of the binder is not particularly limited, but preferably 20 mass % or less, more preferably 10 mass % or less, per the total amount of the inorganic oxide and the binder. In addition, the content of the binder is preferably 1 mass % or more, more preferably 2 mass % or more, per the total amount of the inorganic oxide and the binder. When such a range is satisfied, the mechanical strength and lithium ion conductivity of the insulating layer can be both achieved in a well-balanced manner.

The thickness of the insulating layer is not particularly limited, but preferably 20 μm or less, and more preferably 15 μm or less. In addition, the thickness of the insulating layer is preferably 2 μm or more, and more preferably 4 μm or more.

As compared with the case where the insulating layer is formed on the surface of a composite layer (positive composite layer or negative composite layer), in the case where the insulating layer is formed on the surface(s) of the separator (one surface or both surfaces), because a layer in which a composite layer and the insulating layer are mixed is not formed on the composite layer-insulating layer interface, the electrical conduction path in the composite layer is well maintained; therefore, this is preferable.

As compared with the case where the insulating layer is formed on the surface of the separator facing the negative electrode, in the case where the insulating layer is formed on the surface of the separator facing the positive electrode, because the insulating layer, which is a porous layer and thus can maintain the electrolyte well, is present near the positive electrode surface. Thus, the fluorophosphate compound represented by general formula (1) is abundantly present on the positive electrode-nonaqueous electrolyte interface, whereby the formation of a low-resistance film derived from the fluorophosphate compound represented by general formula (1) is promoted; therefore, this is preferable.

[Other Components]

In addition, other components of the battery include terminals, an insulating plate, a battery case, and the like. As these constituent elements, conventionally used ones may be used in the nonaqueous electrolyte secondary battery of the present invention as it is.

[Configuration of Nonaqueous Electrolyte Secondary Battery]

The configuration of the nonaqueous electrolyte secondary battery of the present invention is not particularly limited, and may be, for example, a cylindrical battery having a positive electrode, a negative electrode, and a rolled separator, a prismatic battery a flat battery, or the like.

[Production Method]

The nonaqueous electrolyte secondary battery of the present invention is produced using a nonaqueous electrolyte containing a monofluorotoluene and a fluorophosphate compound represented by the above general formula (1). Specifically the nonaqueous electrolyte secondary battery of the present invention is produced by assembling a nonaqueous electrolyte secondary battery using a nonaqueous electrolyte, a positive electrode, a negative electrode, and a separator.

[Energy Storage Apparatus]

Figure 2:
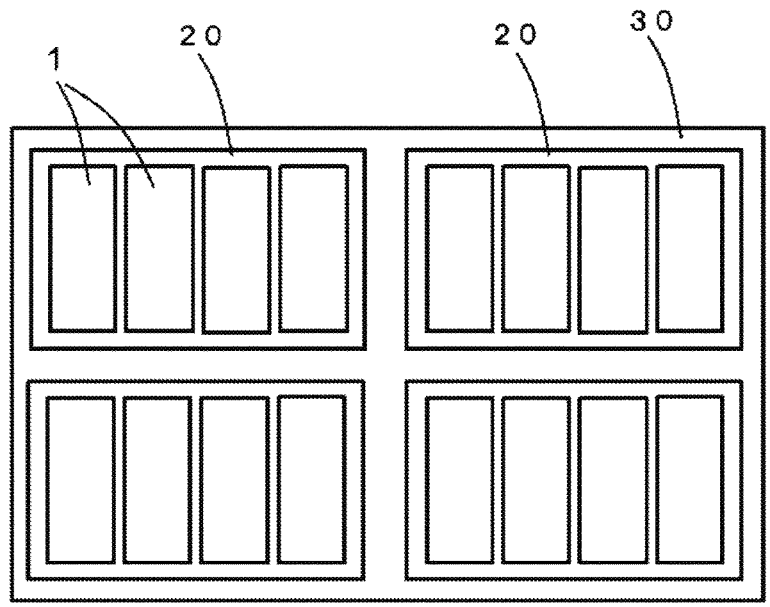
FIG. 2 is a schematic diagram showing an energy storage apparatus including the nonaqueous electrolyte secondary battery of the present invention.

Using an assembled battery formed of a combination of a plurality of the nonaqueous electrolyte secondary batteries of the present invention, an energy storage apparatus can be formed. FIG. 2 shows one embodiment of such an energy storage apparatus. An energy storage apparatus 30 includes a plurality of energy storage units 20. Each energy storage unit 20 is composed of an assembled battery including a plurality of nonaqueous electrolyte secondary batteries 1. The energy storage apparatus 30 can be mounted as an automotive power supply for electric vehicles (EV), hybrid electric vehicles (HEV), plug-in hybrid electric vehicles (PHEV), and the like.

[Automobile]

Figure 3:
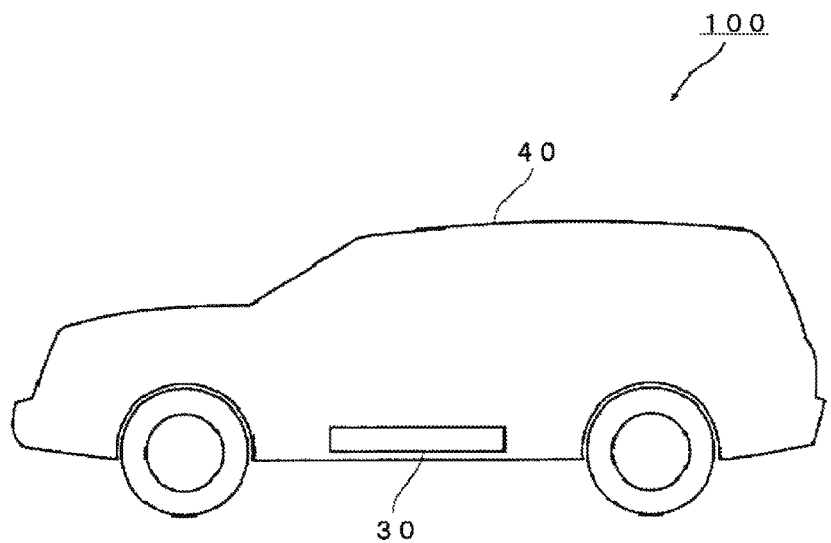
FIG. 3 is a schematic diagram showing an automobile including an energy storage apparatus including the nonaqueous electrolyte secondary battery of the present invention.

The energy storage apparatus 30 using the nonaqueous electrolyte secondary battery of the present invention can be mounted on an automobile 100 as an automotive power supply for electric vehicles (EV), hybrid electric vehicles (HEV), plug-in hybrid electric vehicles (PHEV), and the like. FIG. 3 shows one embodiment of such an automobile. As compared with a battery mounted as the power supply of an electric vehicle (EV) or a hybrid electric vehicle (HEV), a battery mounted as the power supply of a plug-in hybrid electric vehicle (PHEV) tends to turn into an overcharged state more easily during the use of the battery. Therefore, the application of the present invention provides significant usefulness. That is, in the case where the nonaqueous electrolyte secondary battery of the present invention is used as the power supply of a plug-in hybrid electric vehicle (PHEV), the advantages of the present invention can be utilized more usefully; therefore, this is preferable.

The charge mode of a power supply used for plug-in hybrid electric vehicles (PHEV) is a combination of the charge mode of a power supply used for electric vehicles (EV) (mode in which the power supply is charged at a plug-in station) and the charge mode of a power supply used for hybrid electric vehicles (HEV) (mode in which the power supply is charged with regeneration energy). Therefore, as compared with the power supply of an electric vehicle (EV) or a hybrid electric vehicle (HEV), the power supply of a plug-in hybrid electric vehicle (PHEV) turns into an overcharged state more easily. In addition, as compared with a battery mounted as the power supply of a hybrid electric vehicle (HEV), a battery mounted as the power supply of a plug-in hybrid electric vehicle (PHEV) tends to have a wider range of SOC (State Of Charge), and thus turns into an overcharged state more easily.

EXAMPLES

Hereinafter, the invention will be described in detail using examples. However, the present invention should not be construed as being limited to these examples.

FIG. 1 shows a schematic cross-sectional view of a nonaqueous electrolyte secondary battery of this example.

The nonaqueous electrolyte secondary battery 1 includes an energy generating element 2 (composed of a positive electrode 3, which is prepared by applying a positive composite to an aluminum current collector, and a negative electrode 4, which is prepared by applying a negative composite to a copper current collector, wound via a separator 5) and a nonaqueous electrolyte housed in a battery case 6. The dimension of the battery is 34 mm in width×48 mm in height×5.0 mm in thickness.

The battery case 6 has a battery cover 7 attached thereto by laser welding, which is equipped with a safety valve 8. A negative electrode terminal 9 is connected to the negative electrode 4 through a negative electrode lead 11, and the positive electrode 3 is connected to the battery cover through a positive electrode lead 10.

The nonaqueous electrolyte secondary battery shown in FIG. 1 was produced as follows.

1. Production of Nonaqueous Electrolyte Secondary Battery of Example 1

(1) Production of Positive Electrode Plate

Using $LiNi_{1/3}Mn_{1/3}Co_{1/3}O_2$ as a positive active material, acetylene black as an electrically conductive auxiliary, and polyvinylidene fluoride as a binder, a mixture of the positive active material, the electrically conductive auxiliary, and the binder in proportions of 90 mass %, 5 mass %, and 5 mass %, respectively, was prepared. A suitable amount of NMP (N-methyl-2-pyrrolidone) was added to the mixture to adjust the viscosity, thereby preparing a positive composite in paste form. The positive composite was applied to both sides of an aluminum foil having a thickness of 20 μm, followed by drying, thereby preparing a positive electrode plate. The positive electrode plate was provided with a region having no positive composite applied, where the aluminum foil was exposed. The region having the aluminum foil exposed and the positive electrode lead were jointed together.

(2) Production of Negative Electrode Plate

Using graphite as a negative active material, styrene-butadiene rubber (SBR) as a binder, and carboxymethylcellulose (CMC) as a thickener, a mixture of the negative active material, the binder, and the thickener in proportions of 95 mass %, 3 mass %, and 2 mass %, respectively, was prepared. A suitable amount of water was added to the mixture to adjust the viscosity, thereby preparing a negative composite in paste form. The negative composite was applied to both sides of a copper foil having a thickness of 10 μm, followed by drying, thereby preparing a negative electrode plate. The negative electrode plate was provided with a region having no negative composite applied, where the copper foil was exposed. The region having the copper foil exposed and the negative electrode plate lead were jointed together.

(3) Production of Secondary Battery not Filled with Electrolyte Solution

A separator formed of a polyethylene microporous membrane was interposed between the positive electrode plate and the negative electrode plate, and the positive electrode plate and the negative electrode plate were wound to produce an energy generating element. The energy generating element was housed in a battery case from the opening of the battery case, and the positive electrode plate lead was joined to the battery cover, while the negative electrode plate lead was joined to the negative electrode terminal. Subsequently, the battery cover was fit into the opening of the battery case, and the battery case and the battery cover were joined together by laser welding, thereby producing a secondary battery not filled with an electrolyte solution, having no nonaqueous electrolyte injected into the battery case.

(4) Preparation and Injection of Nonaqueous Electrolyte

In a mixed solvent of ethylene carbonate (EC):ethyl methyl carbonate (EMC)=30:70 (volume ratio), $LiPF_6$ was dissolved at a concentration of 1 mol/L, and 2-fluorotoluene (orthofluorotoluene) and lithium difluorophosphate were added in proportions of 5.0 mass % and 1.0 mass %, respectively, per the total mass of the nonaqueous electrolyte, thereby preparing a nonaqueous electrolyte. The nonaqueous electrolyte was injected into the battery case from the injection port provided in the side surface of the battery case. Subsequently, the injection port was closed with a plug, thereby producing a nonaqueous electrolyte secondary battery of Example 1 having a nominal capacity of 800 mAh (hereinafter sometimes simply referred to as "battery").

2. Production of Nonaqueous Electrolyte Secondary Batteries of Examples 2 to 4 and Example 17

A battery of Example 2 was produced in the same manner as for the battery of Example 1, except that lithium difluorophosphate in Example 1 was replaced with lithium monofluorophosphate, and the content of lithium monofluorophosphate per the total mass of the nonaqueous electrolyte was 1.0 mass %.

A battery of Example 3 was produced in the same manner as for the battery of Example 1, except that lithium difluorophosphate in Example 1 was replaced with methyl difluorophosphate, and the content of methyl difluorophosphate per the total mass of the nonaqueous electrolyte was 1.0 mass %.

A battery of Example 4 was produced in the same manner as for the battery of Example 1, except that lithium difluorophosphate in Example 1 was replaced with ethyl difluorophosphate, and the content of ethyl difluorophosphate per the total mass of the nonaqueous electrolyte was 1.0 mass %.

A battery of Example 17 was produced in the same manner as for the battery of Example 1, except that lithium difluorophosphate in Example 1 was replaced with sodium difluorophosphate, and the content of sodium difluorophosphate per the total mass of the nonaqueous electrolyte was 1.0 mass %.

3. Production of Nonaqueous Electrolyte Secondary Batteries of Examples 5 to 10 and Comparative Example 1

Batteries of Examples 5 to 10 and Comparative Example 1 were produced in the same manner as for the battery of Example 1, except that the contents of lithium difluorophosphate per the total mass of the nonaqueous electrolyte were 0.05 mass %, 0.5 mass %, 1.5 mass %, 2.0 mass %, 4.0 mass %, 6.0 mass %, and 0.00 mass % (no lithium difluorophosphate contained), respectively.

4. Production of Nonaqueous Electrolyte Secondary Batteries of Examples 11 to 14 and Comparative Example 2

Batteries of Examples 11 to 14 and Comparative Example 2 were produced in the same manner as for the battery of Example 1, except that the contents of 2-fluorotoluene per the total mass of the nonaqueous electrolyte were 2.0 mass %, 4.0 mass %, 8.0 mass %, 10.0 mass %, and 0.00 mass % (no 2-fluorotoluene contained), respectively.

5. Production of Nonaqueous Electrolyte Secondary Batteries of Examples 15 to 16 and Comparative Examples 3 to 4

A battery of Example 15 was produced in the same manner as for the battery of Example 1, except that 2-fluorotoluene in Example 1 was replaced with 3-fluorotoluene (metafluorotoluene), and the content of 3-fluorotoluene per the total mass of the nonaqueous electrolyte was 5.0 mass %.

A battery of Example 16 was produced in the same manner as for the battery of Example 1, except that 2-fluorotoluene in Example 1 was replaced with 4-fluorotoluene (parafluorotoluene), and the content of 4-fluorotoluene per the total mass of the nonaqueous electrolyte was 5.0 mass %.

A battery of Comparative Example 3 was produced in the same manner as for the battery of Example 1, except that 2-fluorotoluene in Example 1 was replaced with fluorobenzene, the content of fluorobenzene per the total mass of the nonaqueous electrolyte was 5.0 mass %, and no lithium difluorophosphate was contained.

A battery of Comparative Example 4 was produced in the same manner as for the battery of Example 1, except that 2-fluorotoluene in Example 1 was replaced with fluorobenzene, and the content of fluorobenzene per the total mass of the nonaqueous electrolyte was 5.0 mass %.

6. Evaluation Test (1) Overcharge Test

Using the batteries of Examples 1 to 17 and Comparative Examples 1 to 4, a test to check the initial discharge capacity was performed by the following method. Each battery was charged to 4.2 V at 25° C. and a constant current of 800 mA and further at a constant voltage of 4.2 V, for 3 hours in total, and then discharged at a constant current of 800 mA to the final voltage of 2.5 V, thereby measuring the initial discharge capacity.

Each battery after the initial discharge capacity measurement was subjected to an overcharge test at 25° C. by the following method. Each battery after the initial discharge capacity measurement was charged to 4.2 V at 25° C. and a constant current of 800 mA and further at a constant voltage of 4.2 V, for 3 hours in total, thereby brining the battery into a fully charged state. Subsequently, the battery was charged at 25° C. and a constant current of 800 mA for 1 hour (overcharged), and then the surface temperature of the lateral part of the battery case of the battery was measured.

In the present invention, the surface temperature of the lateral part of the battery case of a battery (battery surface temperature) was measured to evaluate whether the overcharge-preventing effect of the monofluorotoluene-containing nonaqueous electrolyte was improved. In the case where the battery surface temperature is low, it is considered that in the overcharged state of the battery, the monofluorotoluene underwent a selective oxidation reaction on the positive electrode-nonaqueous electrolyte interface, and the oxidation decomposition reaction of the nonaqueous solvent was suppressed, whereby the amount of heat generation in the nonaqueous electrolyte secondary battery decreased. That is, when the battery surface temperature is low, it can be judged that the overcharge-preventing effect of the monofluorotoluene-containing nonaqueous electrolyte has been improved.

The overcharge test results of the batteries (Examples 1 to 17 and Comparative Examples 1 to 4) measured as above are shown in Table 1.

7. Discussion

In batteries containing 10.0 mass % or less of a monofluorotoluene and 6.0 mass % or less of a fluorophosphate compound represented by general formula (1) per the nonaqueous electrolyte (Examples 1 to 17), the battery surface temperature was 70° C. or less. Meanwhile, in a battery containing 10.0 mass % or less of a monofluorotoluene and no fluorophosphate compound represented by general formula (1) (Comparative Example 1), the battery surface temperature was more than 71.7° C. The reason for this is considered to be as follows: in the batteries of Examples 1 to 17, a low-resistance film derived from the fluorophosphate compound represented by general formula (1) was formed on the positive electrode-nonaqueous electrolyte interface. As a result, in an overcharged state of the battery, the monofluorotoluene underwent a selective oxidation reaction on the positive electrode-nonaqueous electrolyte interface, thereby suppressing the oxidation decomposition reaction of the nonaqueous solvent on the positive electrode-nonaqueous electrolyte interface, resulting in the suppression of heat generation accompanying the oxidation reaction of the nonaqueous solvent. That is, for example, as compared with a battery containing 5.0 mass % of 2-fluorotoluene (Comparative Example 1), a battery containing 5.0 mass % of 2-fluorotoluene and 1.0 mass % of lithium difluorophosphate per the total mass of the nonaqueous electrolyte (Example 1) has a lower battery surface temperature. From this, it turned out that the oxidation decomposition reaction of the nonaqueous solvent in an overcharged state of the battery was suppressed, and the overcharge-preventing effect of the monofluorotoluene-containing nonaqueous electrolyte was improved.

Among fluorophosphate compounds represented by general formula (1), batteries containing a fluorophosphate compound wherein $R^1$ is lithium or a alkyl group having 1 to 3 carbon atoms, and $R^2$ is fluorine, an —O—Li group, or a alkoxy group having 1 to 3 carbon atoms, had a battery surface temperature of 70° C. or less (Examples 1 to 16). Meanwhile, among fluorophosphate compounds represented by general formula (1), a battery containing a compound wherein $R^1$ is sodium, and $R^2$ is fluorine (sodium difluoro-

TABLE 1

|  | Monofluorotoluene | | Fluorophosphate compound | | Battery surface temperature after |
| --- | --- | --- | --- | --- | --- |
|  | Name | Amount added/mass % | Name | Amount added/mass % | overcharge test/° C. |
| Example 1 | 2-Fluorotoluene | 5.0 | Lithium difluorophosphate | 1.0 | 59.9 |
| Example 2 | 2-Fluorotoluene | 5.0 | Lithium monofluorophosphate | 1.0 | 64.9 |
| Example 3 | 2-Fluorotoluene | 5.0 | Methyl difluorophosphate | 1.0 | 60.6 |
| Example 4 | 2-Fluorotoluene | 5.0 | Ethyl difluorophosphate | 1.0 | 60.4 |
| Comparative Example 1 | 2-Fluorotoluene | 5.0 | None | — | 72.5 |
| Example 17 | 2-Fluorotoluene | 5.0 | Sodium difluorophosphate | 1.0 | 71.7 |
| Example 5 | 2-Fluorotoluene | 5.0 | Lithium difluorophosphate | 0.05 | 68.5 |
| Example 6 | 2-Fluorotoluene | 5.0 | Lithium difluorophosphate | 0.5 | 64.8 |
| Example 7 | 2-Fluorotoluene | 5.0 | Lithium difluorophosphate | 1.5 | 57.8 |
| Example 8 | 2-Fluorotoluene | 5.0 | Lithium difluorophosphate | 2.0 | 60.4 |
| Example 9 | 2-Fluorotoluene | 5.0 | Lithium difluorophosphate | 4.0 | 60.8 |
| Example 10 | 2-Fluorotoluene | 5.0 | Lithium difluorophosphate | 6.0 | 62.7 |
| Comparative Example 2 | None | — | Lithium difluorophosphate | 1.0 | 84.0 |
| Example 11 | 2-Fluorotoluene | 2.0 | Lithium difluorophosphate | 1.0 | 68.3 |
| Example 12 | 2-Fluorotoluene | 4.0 | Lithium difluorophosphate | 1.0 | 60.8 |
| Example 13 | 2-Fluorotoluene | 8.0 | Lithium difluorophosphate | 1.0 | 62.7 |
| Example 14 | 2-Fluorotoluene | 10.0 | Lithium difluorophosphate | 1.0 | 69.6 |
| Example 15 | 3-Fluorotoluene | 5.0 | Lithium difluorophosphate | 1.0 | 67.6 |
| Example 16 | 4-Fluorotoluene | 5.0 | Lithium difluorophosphate | 1.0 | 64.9 |
| Comparative Example 3 | Fluorobenzene | 5.0 | None | — | 83.1 |
| Comparative Example 4 | Fluorobenzene | 5.0 | Lithium difluorophosphate | 1.0 | 82.9 | phosphate), had a battery surface temperature of 71.7° C. (Example 17). That is, when the fluorophosphate compound represented by general formula (1) is a fluorophosphate compound wherein $R^1$ is lithium or a alkyl group having 1 to 3 carbon atoms, and $R^2$ is fluorine, an —O—Li group, or a alkoxy group having 1 to 3 carbon atoms, the overcharge-preventing effect of the monofluorotoluene-containing nonaqueous electrolyte can be further improved; therefore, this is preferable.

In addition, from the batteries of Example 1, Example 3, and Example 4, it also turned out that among lithium difluorophosphate, methyl difluorophosphate, and ethyl difluorophosphate (difluorophosphate compounds), which are fluorophosphate compounds represented by general formula (1), the surface temperature of the battery of Example 1 using lithium difluorophosphate is the lowest. That is, it turned out that in order to improve the overcharge-preventing effect of the monofluorotoluene-containing nonaqueous electrolyte, it is preferable to use lithium difluorophosphate. Similarly, among monofluorophosphate compounds, which are fluorophosphate compounds represented by general formula (1), lithium monofluorophosphate containing lithium in the compound [in general formula (1), $R^1$ is lithium, and $R^2$ is an —O—Li group], such as lithium difluorophosphate, is considered to be preferable.

In addition, as a result of the comparison of battery surface temperature between the batteries of Comparative Example 3 and Comparative Example 4, it turned out that in the case where fluorobenzene is used as an overcharge inhibitor, even when a fluorophosphate compound represented by general formula (1) is present together, the overcharge-preventing effect shows no improving tendency.

INDUSTRIAL APPLICABILITY

In the nonaqueous electrolyte secondary battery according to the present invention, the monofluorotoluene-containing nonaqueous electrolyte has an improved overcharge-preventing effect, whereby the temperature rise in an overcharged state of the battery is suppressed, and the influences on adjacent devices can be reduced. Therefore, such a nonaqueous electrolyte secondary battery can be effectively utilized as an automotive power supply for electric vehicles (EV), hybrid electric vehicles (HEV), plug-in hybrid electric vehicles (PHEV), and the like, a power supply for electronic devices, a power supply for powder storage, etc.

DESCRIPTION OF REFERENCE SIGNS

1 Nonaqueous electrolyte secondary battery
2 Energy generating element
3 Positive electrode plate (positive electrode)
4 Negative electrode plate (negative electrode)
5 Separator
6 Battery case
7 Battery cover
8 Safety valve
9 Negative terminal
10 Positive electrode lead
11 Negative electrode lead
20 Energy storage unit
30 Energy storage apparatus
40 Main car body
100 Automobile

The invention claimed is:

1. A nonaqueous electrolyte secondary battery comprising a nonaqueous electrolyte,
    wherein the nonaqueous electrolyte contains 2-fluorotoluene and lithium difluorophosphate,
    the content of the 2-fluorotoluene is 4 mass % or more and 8 mass % or less per the nonaqueous electrolyte, and
    the content of the lithium difluorophosphate is 1 mass % or more and 6 mass % or less per the nonaqueous electrolyte.

2. The nonaqueous electrolyte secondary battery according to claim 1, comprising a positive electrode, a negative electrode, a separator, and an insulating layer,
    wherein the separator and the insulating layer are placed between the positive electrode and the negative electrode.

3. The nonaqueous electrolyte secondary battery according to claim 2, wherein the insulating layer is a porous layer containing an inorganic oxide.

4. The nonaqueous electrolyte secondary battery according to claim 2, wherein the insulating layer is formed on a surface of the separator facing the positive electrode.

5. An assembled battery comprising a plurality of the nonaqueous electrolyte secondary batteries according to claim 1.

6. An energy storage apparatus comprising the assembled battery according to claim 5.

7. An automobile comprising the energy storage apparatus according to claim 6.

8. A plug-in hybrid electric vehicle comprising the energy storage apparatus according to claim 6.

9. A method for producing a nonaqueous electrolyte secondary battery including a nonaqueous electrolyte, comprising:
    using a nonaqueous electrolyte containing 2-fluorotoluene and lithium difluorophosphate,
    wherein the content of the 2-fluorotoluene is 4 mass % or more and 8 mass % or less per the nonaqueous electrolyte, and
    the content of the lithium difluorophosphate is 1 mass % or more and 6 mass % or less per the nonaqueous electrolyte.

* * * * *